United States Patent
Tomioka

(10) Patent No.: US 12,447,956 B2
(45) Date of Patent: Oct. 21, 2025

(54) PATH GENERATION APPARATUS

(71) Applicant: Honda Motor Co., Ltd., Tokyo (JP)

(72) Inventor: Kazuki Tomioka, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 166 days.

(21) Appl. No.: 18/221,815

(22) Filed: Jul. 13, 2023

(65) Prior Publication Data

US 2024/0025403 A1 Jan. 25, 2024

(30) Foreign Application Priority Data

Jul. 19, 2022 (JP) ................. 2022-114687

(51) Int. Cl.
*B60W 30/095* (2012.01)
*B60W 30/12* (2020.01)
(Continued)

(52) U.S. Cl.
CPC ............ *B60W 30/12* (2013.01); *B60W 30/16* (2013.01); *B60W 60/001* (2020.02); *G06V 20/56* (2022.01);
(Continued)

(58) Field of Classification Search
CPC ...... G06V 20/58; G06V 20/588; G06V 20/56; B60W 2552/53; B60W 2554/4041;
(Continued)

(56) References Cited

U.S. PATENT DOCUMENTS 8,504,233 B1 * 8/2013 Ferguson ............ B60W 60/00
340/463
8,725,342 B2 * 5/2014 Ferguson ............ G06V 20/588
340/463
(Continued)

FOREIGN PATENT DOCUMENTS

JP 2015058920 A 3/2015
JP 2022034445 A 3/2022

OTHER PUBLICATIONS

Japanese office action; Application 2022-114687; Jan. 30, 2024.

*Primary Examiner* — Gonzalo Laguarda
(74) *Attorney, Agent, or Firm* — Duft & Bornsen, PC

(57) ABSTRACT

Path generation apparatus, includes: sensor mounted on vehicle and detecting external situation with advancing direction of vehicle as center; and ECU including processor and memory. ECU perform: acquiring location information of object in surrounding area of vehicle based on external situation detected by sensor; generating target path of vehicle based on location information; determining whether buffer area within predetermined range in width direction from vehicle-traveling-in-parallel in adjacent lane overlaps target path based on location information; offsetting target path in direction away from vehicle-traveling-in-parallel when buffer area overlaps target path; determining whether vehicle-traveling-in-parallel in left adjacent lane and vehicle-traveling-in-parallel in right adjacent lane are present within predetermined range based on location information; and prohibiting offsetting of target path when vehicle- (Continued)

traveling-in-parallel in left adjacent lane and vehicle-traveling-in-parallel in right adjacent lane are present within the predetermined range.

7 Claims, 8 Drawing Sheets

(51) Int. Cl.
    *B60W 30/16*     (2020.01)
    *B60W 60/00*     (2020.01)
    *G06V 20/56*     (2022.01)

(52) U.S. Cl.
    CPC ... *B60W 2420/403* (2013.01); *B60W 2552/53* (2020.02); *B60W 2554/4041* (2020.02); *B60W 2554/801* (2020.02)

(58) Field of Classification Search
    CPC .... B60W 30/12; B60W 30/16; B60W 60/001; G05D 1/0212
    See application file for complete search history.

(56) References Cited

U.S. PATENT DOCUMENTS

| | | | |
|---|---|---|---|
| 10,569,773 B2 * | 2/2020 | Zhao | G06V 20/58 |
| 10,884,115 B2 * | 1/2021 | Ingram | G01S 17/86 |
| 11,858,493 B2 * | 1/2024 | Hwang | G06V 10/25 |
| 2024/0043065 A1 | 2/2024 | Muramatsu et al. | |

* cited by examiner

PATH GENERATION APPARATUS

CROSS-REFERENCE TO RELATED APPLICATION

This application is based upon and claims the benefit of priority from Japanese Patent Application No. 2022-114687 filed on Jul. 19, 2022, the content of which is incorporated herein by reference.

BACKGROUND OF THE INVENTION

Field of the Invention

This invention relates to a path generation apparatus configured to generate a target traveling path of a vehicle having an automatic driving function or a driving assistance function.

Description of the Related Art

There has been conventionally known a device that generates a target path of a vehicle having a driving assistance function (for example, see JP 2015-058920 A). In the device described in JP 2015-058920 A, traveling paths of a preceding vehicle and an entering vehicle are acquired, and a target traveling path of the self-vehicle is set, based on the traveling path of the entering vehicle, when and after a location point where a deviation amount of the traveling paths of the preceding vehicle and the entering vehicle is equal to or smaller than a predetermined value.

As vehicles each having an automatic driving function and/or a driving assistance function become widely used, safety and convenience of the entire transportation society are improved, and sustainable transportation systems are achievable. In addition, since the efficiency and smoothness of transportation are improved, the $CO_2$ emission amount is reduced, and the load on environment can be reduced.

In a case where the vehicle width of a vehicle traveling in parallel in an adjacent lane is large, by the way, a target path is desirably generated to keep a certain distance from the vehicle traveling in parallel in order to reduce an uneasy feeling of an occupant. However, in a case where such vehicles traveling in parallel are present on both left and right sides, and when a traveling scene in which the self-vehicle overtakes the vehicle traveling in parallel or the self-vehicle is overtaken by the vehicle traveling in parallel continues, the target path is frequently changed, and this may give the occupant a sense of incongruity conversely.

SUMMARY OF THE INVENTION

An aspect of the present invention is a path generation apparatus, including: an external sensor mounted on a self-vehicle and configured to detect an external situation with an advancing direction of the self-vehicle as a center; and an electronic control unit including a processor and a memory coupled to the processor. The electronic control unit is configured to perform: acquiring location information of an object in a surrounding area of the self-vehicle based on the external situation detected by the external sensor; generating a target path of the self-vehicle based on the location information; determining whether a buffer area within a predetermined range in a vehicle width direction from a vehicle traveling in parallel in an adjacent lane adjacent to an own lane in which the self-vehicle is traveling overlaps the target path based on the location information; offsetting the target path in a direction away from the vehicle traveling in parallel when it is determined that the buffer area overlaps the target path; determining whether the vehicle traveling in parallel in a left adjacent lane adjacent to a left side of the own lane and the vehicle traveling in parallel in a right adjacent lane adjacent to a right side of the own lane are present within the predetermined range based on the location information; and prohibiting the offsetting of the target path when it is determined that the vehicle traveling in parallel in the left adjacent lane and the vehicle traveling in parallel in the right adjacent lane are present within the predetermined range.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 8. A path generation apparatus according to an embodiment of the present invention is applied to a vehicle having a driving assistance function of performing driving assistance for a driver of a self-vehicle or controlling a traveling actuator to automatically drive the self-vehicle, and generates a target path (target traveling path) of the self-vehicle. The "driving assistance" in the present embodiment includes driving assistance for assisting a driver's driving operation and automatic driving for automatically driving the vehicle regardless of the driver's driving operation, and corresponds to automatic driving of levels 1 to 4 defined by SAE, and the "automatic driving" corresponds to automatic driving of level 5.

During the driving assistance or the automatic driving, for example, a target path is generated along the center of its own lane, based on a recognition result of the surroundings of the self-vehicle by a camera or the like, and a steering mechanism of the self-vehicle is controlled to travel along the generated target path. In addition, for example, a driving mechanism and a braking mechanism are controlled so that the self-vehicle travels keeping a certain distance from a preceding vehicle. In this case, when a vehicle traveling in parallel changes lanes (cuts in) from an adjacent lane to the own lane and becomes a preceding vehicle, the driving mechanism and the braking mechanism are controlled so that the self-vehicle travels keeping a certain distance from such a preceding vehicle.

Nevertheless, when the steering mechanism is controlled to simply travel along the target path along the center of the own lane, in a case where the vehicle width of the vehicle traveling in parallel is large or while the vehicle traveling in parallel is traveling closer to the own lane, the occupant may feel uneasy. Therefore, in the present embodiment, the path generation apparatus is configured to offset the target path in a direction away from the vehicle traveling in parallel near the own lane so as to keep a certain distance from not only the preceding vehicle but also the vehicle traveling in parallel.

In this situation, in a case where vehicles traveling in parallel near the own lane are present on both left and right sides, and when the traveling scene in which the self-vehicle overtakes the vehicle traveling in parallel or the self-vehicle is overtaken by the vehicle traveling in parallel continues, the target path is frequently changed, and this may give the occupant a sense of incongruity conversely. Accordingly, in the present embodiment, the path generation apparatus is configured as follows to prohibit offset of the target path depending on the traveling scene, so that frequent changes in the target path can be suppressed.

Figure 1:
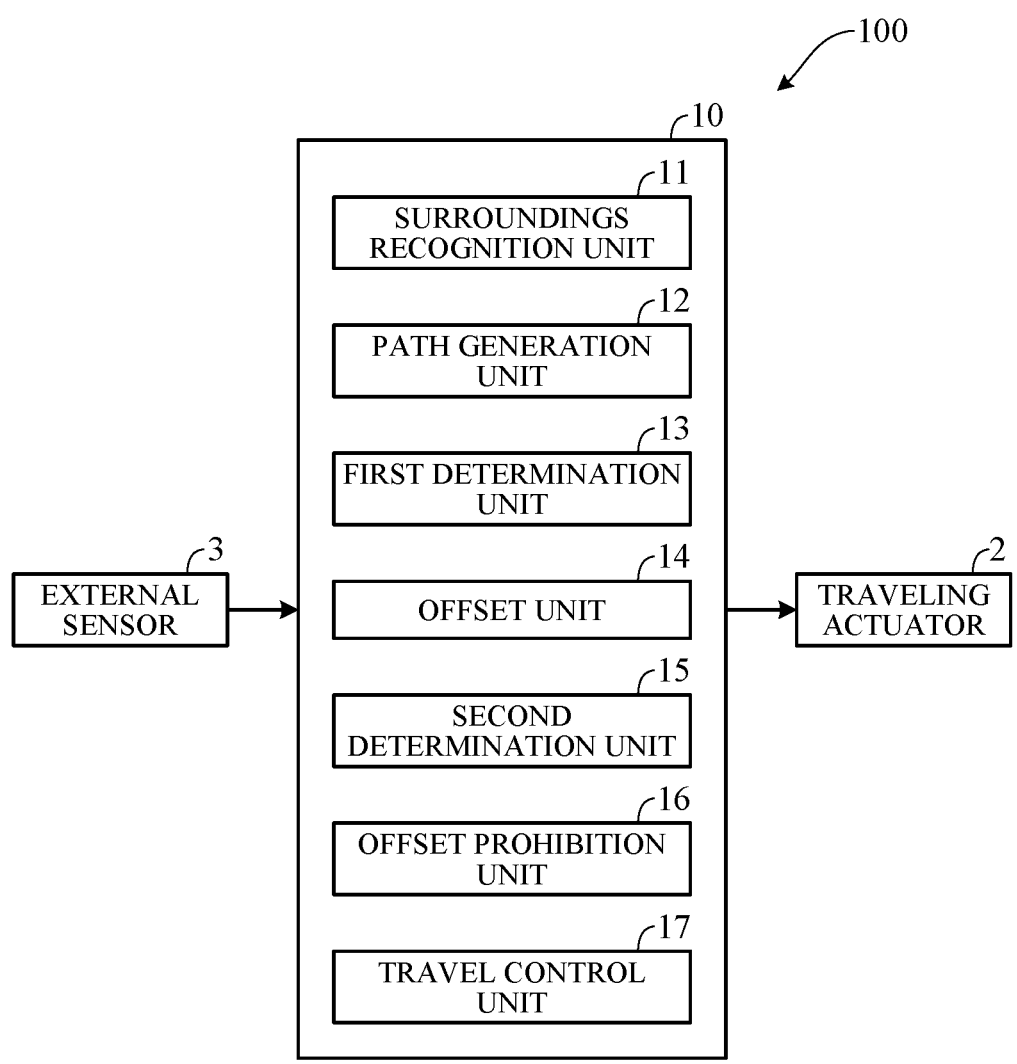
FIG. 1 is a block diagram schematically illustrating an example of a configuration of main components of a path generation apparatus according to an embodiment of the present invention.

FIG. 1 is a block diagram schematically illustrating an example of a configuration of main components of a path generation apparatus (hereinafter, a device) 100 according to an embodiment of the present invention. As illustrated in FIG. 1, the apparatus 100 mainly includes an electronic control unit (ECU) 10. The ECU 10 includes a computer including a CPU, a RAM, a ROM, an I/O interface, and other peripheral circuits. The ECU 10 is configured, for example, as a part of a plurality of ECU groups that are mounted on a self-vehicle 1 and that control the movement of the self-vehicle 1.

A traveling actuator 2 mounted on the self-vehicle 1 and an external sensor 3 are connected with the ECU 10. The traveling actuator 2 includes a driving mechanism such as an engine or a motor that drives the self-vehicle 1, a braking mechanism such as a brake that applies the brakes on the self-vehicle 1, and a steering mechanism such as a steering gear that steers the self-vehicle 1.

The external sensor 3 detects an external situation including a location of an object in a surrounding area of the self-vehicle 1. The external sensor 3 includes an imaging element such as a CCD or a CMOS, and includes a camera that images the surroundings of the self-vehicle 1. The external sensor 3 may include a distance detection unit that detects a distance from the self-vehicle 1 to an object in a surrounding area. The distance detection unit includes, for example, a millimeter wave radar that emits a millimeter wave (radio wave) and measures a distance and a direction to an object from a time until the emitted wave hits the object and returns. The distance detection unit may include a LiDAR that emits laser light and measures a distance and a direction to an object from a time until the irradiated light hits the object and returns.

The ECU 10 includes, as a functional configuration of the CPU, a surroundings recognition unit 11, a path generation unit 12, a first determination unit 13, an offset unit 14, a second determination unit 15, an offset prohibition unit 16, and a travel control unit 17. That is, the CPU of the ECU 10 functions as the surroundings recognition unit 11, the path generation unit 12, the first determination unit 13, the offset unit 14, the second determination unit 15, the offset prohibition unit 16, and the travel control unit 17.

The surroundings recognition unit 11 recognizes locations of a division line, a curbstone, a guardrail, and the like on a road in surrounding areas with an advancing direction of the self-vehicle 1 as the center, based on signals from the external sensor 3, and thus recognizes an own lane LO in which the self-vehicle 1 is traveling. In addition, adjacent lanes LA and LB (a left adjacent lane LA and a right adjacent lane LB) adjacent to the left and right sides of the own lane LO are recognized.

The surroundings recognition unit 11 further recognizes other vehicles by recognizing the locations of contours of other vehicles including a preceding vehicle traveling on a forward side of the self-vehicle 1 in the own lane LO, a following vehicle traveling on a rearward side of the self-vehicle 1, and the vehicles 4A and 4B traveling in parallel respectively in the adjacent lanes LA and LB. The vehicles 4A and 4B traveling in parallel include vehicles 4A and 4B traveling in parallel respectively in the adjacent lanes LA and LB on a forward side of the self-vehicle 1 and vehicles 4A and 4B traveling in parallel respectively in the adjacent lanes LA and LB on a rearward side of the self-vehicle 1.

That is, the surroundings recognition unit 11 acquires location information of objects in surrounding areas of the self-vehicle 1 including the traveling lane and other vehicles, based on the signals from the external sensor 3. In other words, the external sensor 3 and the surroundings recognition unit 11 function as an information acquisition unit that acquires the location information of objects in surrounding areas of the self-vehicle 1.

Figure 2:
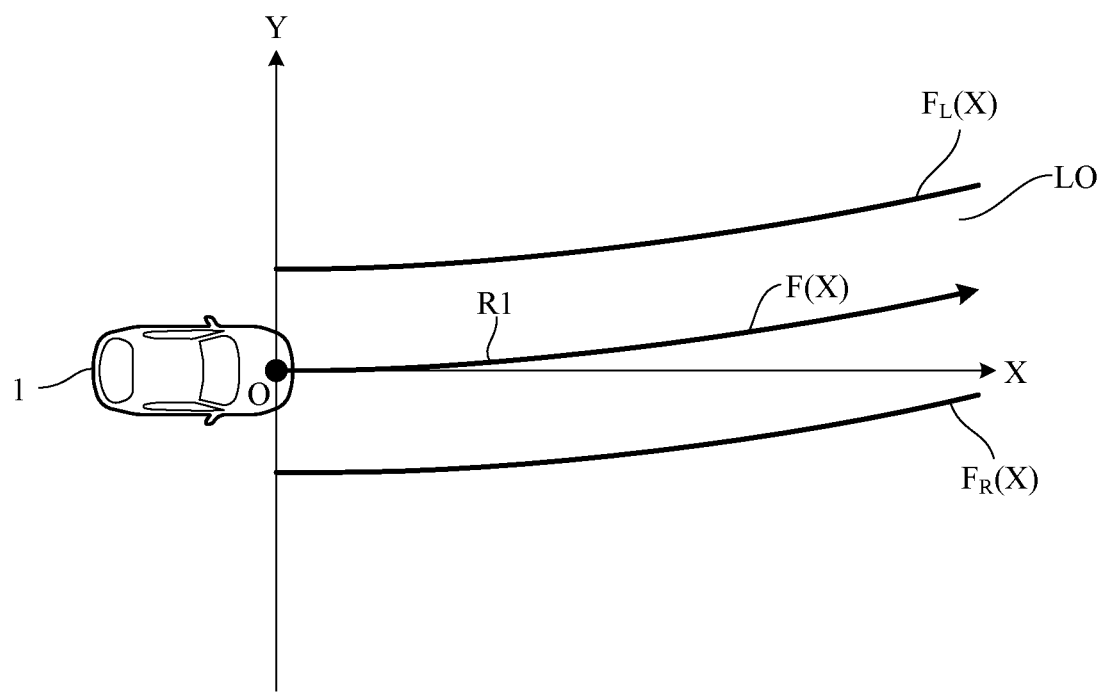
FIG. 2 is a diagram for describing generation of a reference target path by a path generation unit in FIG. 1.

FIG. 2 is a diagram for describing generation of a reference target path R1 by the path generation unit 12. The path generation unit 12 generates the reference target path R1, for example, along the center of the own lane LO in which the self-vehicle 1 is traveling, based on a recognition result of the surroundings recognition unit 11. A general road shape is designed by use of a clothoid curve in which a curvature changes at a constant rate, and some sections of the clothoid curve corresponding to the road shape can be approximated by use of a high-order function such as a cubic function. They may be approximated by use of a vehicle movement model such as a two-wheeled model.

The path generation unit 12 identifies an advancing direction of the self-vehicle 1 with respect to the own lane LO, based on the recognition result of the surroundings recognition unit 11, and derives a cubic function $F(X)$ representing the center line of the own lane LO with the current location point of the self-vehicle 1 as the origin O and the identified advancing direction as X axis. That is, the cubic functions $F_L(X)$ and $F_R(X)$ of following expressions (i) and (ii), which approximate the left and right division lines (or curbstones, guard rails, or the like) that have been recognized by the surroundings recognition unit 11, are derived in a curve fitting method such as a least squares method.

$$F_L(X) = C_{3L}X^3 + C_{2L}X^2 + C_{1L}X + C_{0L} \quad (i)$$

$$F_R(X) = C_{3R}X^3 + C_{2R}X^2 + C_{1R}X + C_{0R} \quad (ii)$$

Next, a cubic function $F(X)$ of the following formula (iii) corresponding to the center line of the own lane LO is derived, based on the cubic functions $F_L(X)$ and $F_R(X)$ respectively corresponding to the left and right division lines, and a normal reference target path R1 is generated along the center line represented by the cubic function $F(X)$ that has been derived.

$$F(X) = C_3 X^3 + C_2 X^2 + C_1 X + C_0 \quad (iii)$$

$$C_3 = (C_{3L} + C_{3R})/2, C_2 = (C_{2L} + C_{2R})/2,$$

$$C_1 = (C_{1L} + C_{1R})/2, C_0 = (C_{0L} + C_{0R})/2$$

Figure 3:
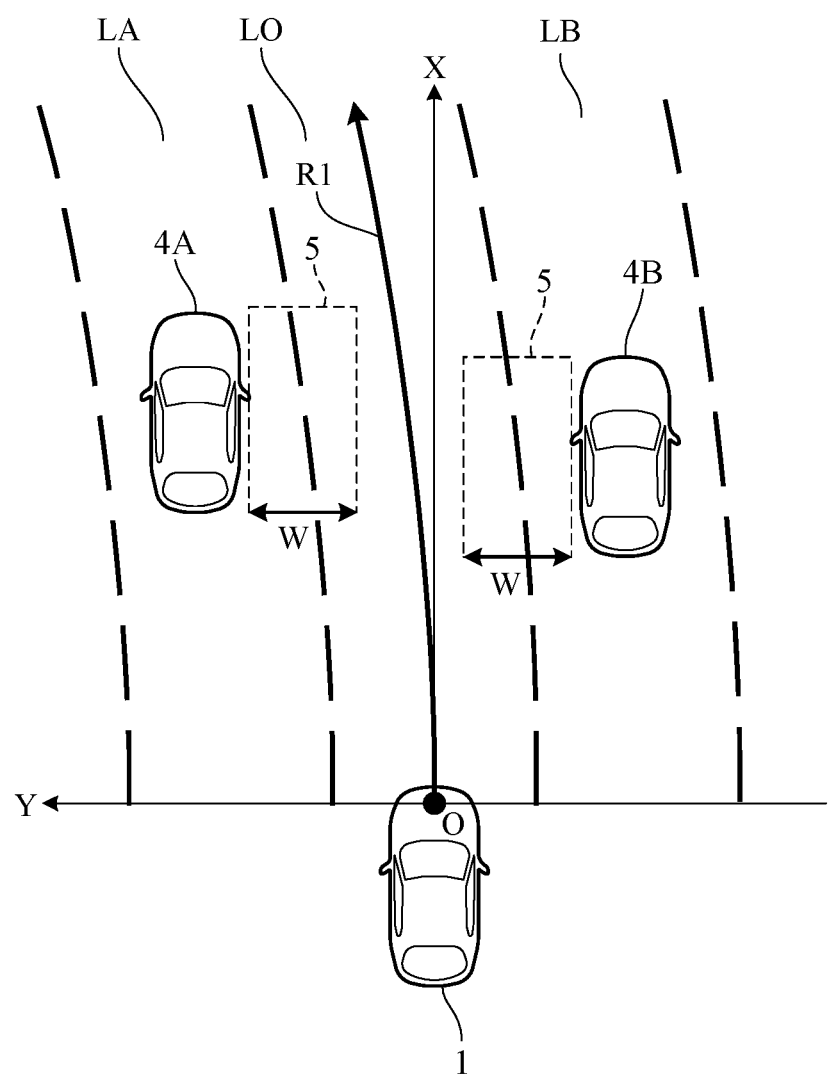
FIG. 3 is a diagram for describing determination of whether it is necessary to offset the reference target path by a first determination unit in FIG. 1.

FIG. 3 is a diagram for describing determination of whether it is necessary to offset the reference target path R1 by the first determination unit 13. As illustrated in FIG. 3, the first determination unit 13 determines whether a buffer area 5 within a predetermined range in the vehicle width direction from the vehicles 4A and 4B traveling in parallel overlaps the reference target path R1, based on the recognition results of the surroundings recognition unit 11. In other words, whether a following expression (iv) is established is determined. In the following expression (iv), "YA" represents a Y coordinate of a right end of the vehicle 4A traveling in parallel on a left side, "YB" represents a Y coordinate of a left end of the vehicle 4B traveling in parallel on a right side that have been recognized by the surroundings recognition unit 11, and "W" represents a length of the predetermined range in the vehicle width direction.

$$YB + W \leq F(X) \leq YA - W \quad (iv)$$

In a case of determining that the buffer area 5 overlaps the reference target path R1 (the expression (iv) is not established), the first determination unit 13 determines that it is necessary to offset the reference target path R1 in order to reduce the uneasy feeling of the occupant. The width of the buffer area 5 to be used when the first determination unit 13 determines whether it is necessary to offset the reference target path R1, that is, the length W of the predetermined range in the vehicle width direction is predefined to a predetermined value (for example, approximately 2.0 m to 2.4 m), based on a test result by a skilled driver.

Figure 4:
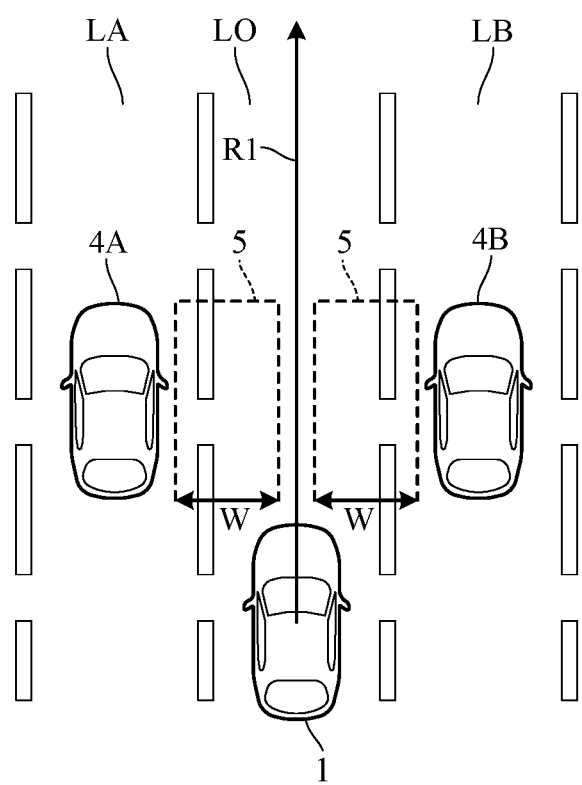
FIG. 4 is a diagram for describing target path in a traveling scene in which neither buffer areas of vehicles traveling in parallel on the left and right sides overlaps the reference target path.

FIGS. 4 to 7B are diagrams for describing final target paths in various traveling scenes. As illustrated in FIG. 4, in a traveling scene in which neither the buffer area 5 of the vehicle 4A traveling in parallel on the left side nor the buffer area 5 of the vehicle 4B traveling in parallel on the right side overlaps the reference target path R1, the reference target path R1 that has been generated by the path generation unit 12 is determined as the final target path without change.

Figure 5A:
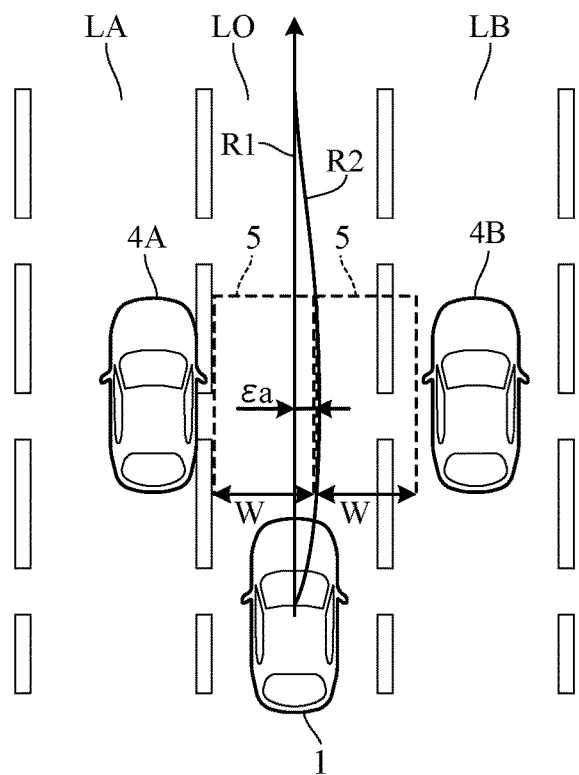
FIG. 5A is a diagram for describing the target path in a traveling scene in which the buffer area of the vehicle traveling in parallel on the left side overlaps the reference target path, when not prohibiting offset.

On the other hand, as illustrated in FIG. 5A, in a traveling scene in which the buffer area 5 of the vehicle 4A traveling in parallel on the left side overlaps the reference target path R1, the first determination unit 13 determines that it is necessary to offset the reference target path R1. In this case, the offset unit 14 first determines whether at least one of the vehicles 4A and 4B traveling in parallel has moved across the division line and has cut in the own lane LO, permits the offset in a case of determining that the vehicle has not cut in, and prohibits the offset in a case of determining that the vehicle has cut in. In a case where it is determined that at least one of the vehicles 4A and 4B traveling in parallel has cut in and the offset of the reference target path R1 by the offset unit 14 is prohibited, the reference target path R1 that has been generated by the path generation unit 12 is determined as the final target path.

In a case where it is determined that neither the vehicle 4A traveling in parallel nor the vehicle 4B traveling in parallel has moved across the division line or has cut in the own lane LO, the offset of the reference target path R1 by the offset unit 14 is permitted. In this situation, in a case where the first determination unit 13 determines that the buffer area 5 of the vehicle 4A traveling in parallel on the left side overlaps the reference target path R1, the offset unit 14 offsets the reference target path R1 in a direction away from the vehicle 4A traveling in parallel on the left side. More specifically, the reference target path R1 is offset to avoid the buffer area 5 of the vehicle 4A traveling in parallel on the left side, and an offset path R2 is generated.

The second determination unit 15 determines whether the vehicle 4A traveling in parallel on the left side and the vehicle 4B traveling in parallel on the right side are present within a predetermined range in the advancing direction of the self-vehicle 1, based on the recognition results by the surroundings recognition unit 11 (an offset prohibition determination of the reference target path R1). In a case where it is determined that the vehicle 4A traveling in parallel on the left side and the vehicle 4B traveling in parallel on the right side are present within the predetermined range in the advancing direction, the second determination unit 15 determines that the current traveling scene is a traveling scene that may give the occupant a sense of incongruity conversely caused by offsetting the reference target path R1.

A length D of the predetermined range in the advancing direction to be used when the second determination unit 15 makes the offset prohibition determination of the reference target path R1 is defined with the self-vehicle 1 as a reference. The length from the self-vehicle 1 to a front end of the predetermined range in the advancing direction and the length from the self-vehicle 1 to a rear end of the predetermined range in the advancing direction may be defined to the same length or may be defined to different lengths. The length D of the predetermined range in the advancing direction may be corrected in accordance with a traveling speed of the self-vehicle 1, traveling speeds of the vehicles 4A and 4B traveling in parallel, or a traveling speed of the following vehicle, or may be corrected in accordance with the type of a road on which the self-vehicle 1 is traveling, a weather condition, or the like.

In a case where the second determination unit 15 determines that neither the vehicle 4A traveling in parallel on the left side nor the vehicle 4B traveling in parallel on the right side is present within the predetermined range in the advancing direction, the offset path R2 that has been generated by the offset unit 14 is determined as the final target path.

Figure 5B:
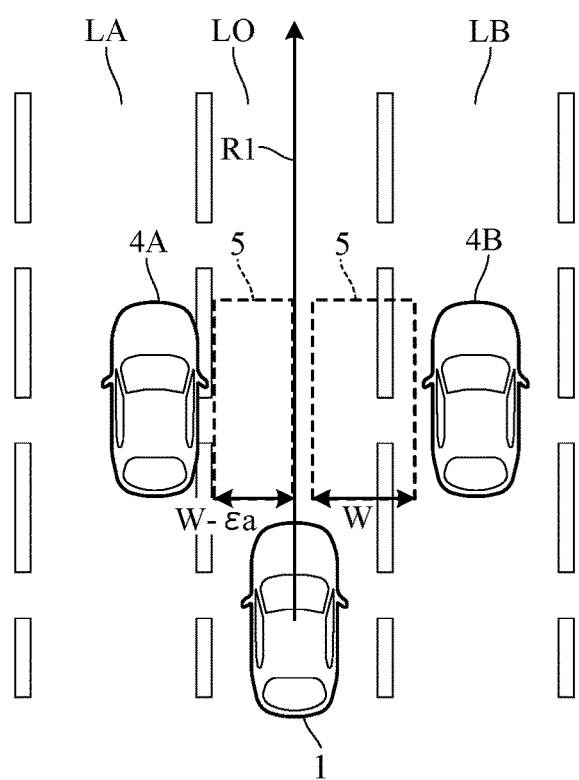
FIG. 5B is a diagram for describing the target path in a traveling scene in which the buffer area of the vehicle traveling in parallel on the left side overlaps the reference target path, when prohibiting offset.

On the other hand, in a case where the second determination unit 15 determines that the vehicle 4A traveling in parallel on the left side and the vehicle 4B traveling in parallel on the right side are present within the predetermined range in the advancing direction, the offset prohibition unit 16 prohibits the offset unit 14 from offsetting the reference target path R1, as illustrated in FIG. 5B. More specifically, a cross-border amount ca (FIG. 5A), by which the buffer area 5 (a right end of the buffer area 5) of the vehicle 4A traveling in parallel on the left side has moved across the reference target path R1 in the vehicle width direction, is calculated, and a setback of narrowing the buffer area of the vehicle 4A traveling in parallel on the left side by the cross-border amount εa that has been calculated is performed.

In an example of FIG. 5B, the buffer area 5 of the vehicle 4A traveling in parallel on the left side is subject to the setback. In this situation, a following expression (v) is established and the first determination unit 13 determines that the buffer area 5 of the vehicle 4A traveling in parallel on the left side does not overlap the reference target path R1. Therefore, it is determined that it is not necessary to offset the reference target path R1, and thus the offset of the reference target path R1 is prohibited. In this case, the reference target path R1 that has been generated by the path generation unit 12 is determined as the final target path.

$$YB+W \leq F(X) \leq YA-W+\varepsilon a \quad (v)$$

Figure 6A:
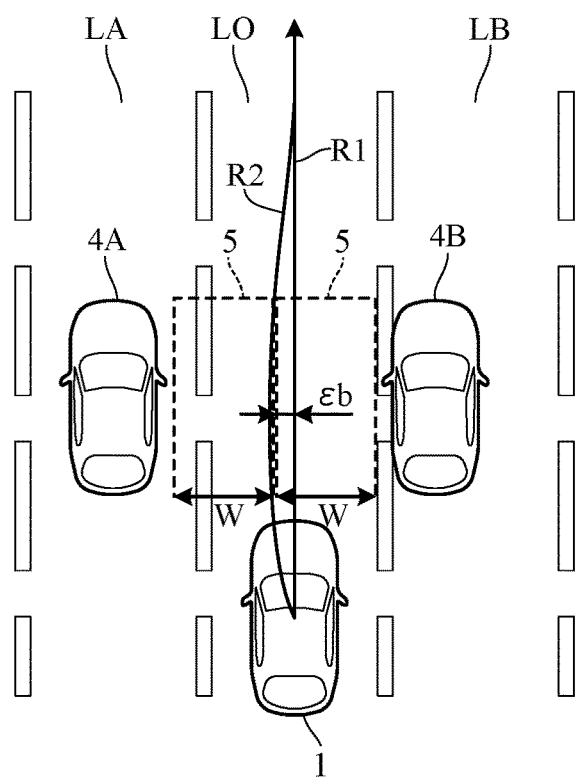
FIG. 6A is a diagram for describing the target path in a traveling scene in which the buffer area of the vehicle traveling in parallel on the right side overlaps the reference target path, when not prohibiting offset.
Figure 6B:
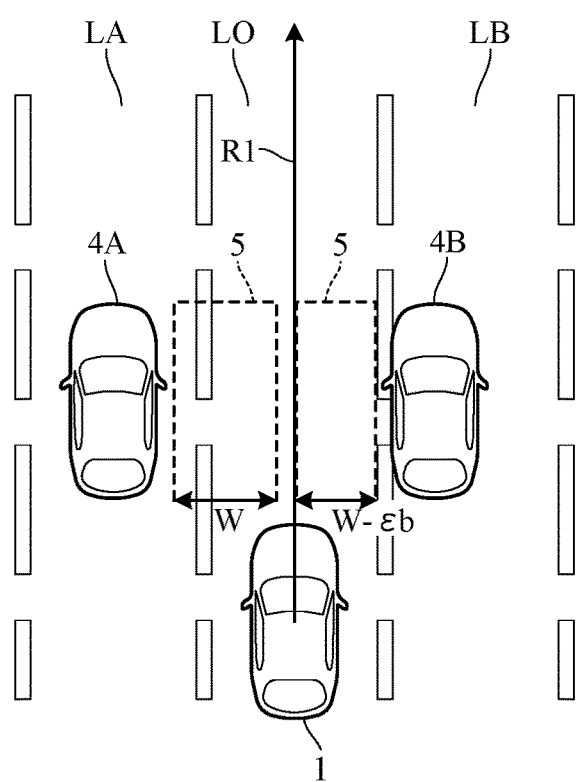
FIG. 6B is a diagram for describing the target path in a traveling scene in which the buffer area of the vehicle traveling in parallel on the right side overlaps the reference target path, when prohibiting offset.

As illustrated in FIG. 6A, also in a travel scene in which the buffer area 5 of the vehicle 4B traveling in parallel on the left side overlaps the reference target path R1 (does not cut in), the first determination unit 13 determines that it is necessary to offset the reference target path R1, and the offset unit 14 generates the offset path R2. Then, in a case where the second determination unit 15 determines that the vehicle 4A traveling in parallel on the left side and the vehicle 4B traveling in parallel on the right side are present within the predetermined range in the advancing direction, the offset prohibition unit 16 calculates the cross-border amount εb (FIG. 6A), and the buffer area 5 of the vehicle 4B traveling in parallel on the right side is subject to the setback, as illustrated in FIG. 6B. In this case, a following expression (vi) is established, and the first determination unit 13 determines that the buffer area 5 of the vehicle 4B traveling in parallel on the right side does not overlap the reference target path R1. Therefore, it is determined that it is not necessary to offset the reference target path R1, and thus the offset of the reference target path R1 is prohibited. Also in this case, the reference target path R1 that has been generated by the path generation unit 12 is determined as the final target path.

$$YB+W-\varepsilon b \leq F(X) \leq YA-W \quad (vi)$$

Figure 7A:
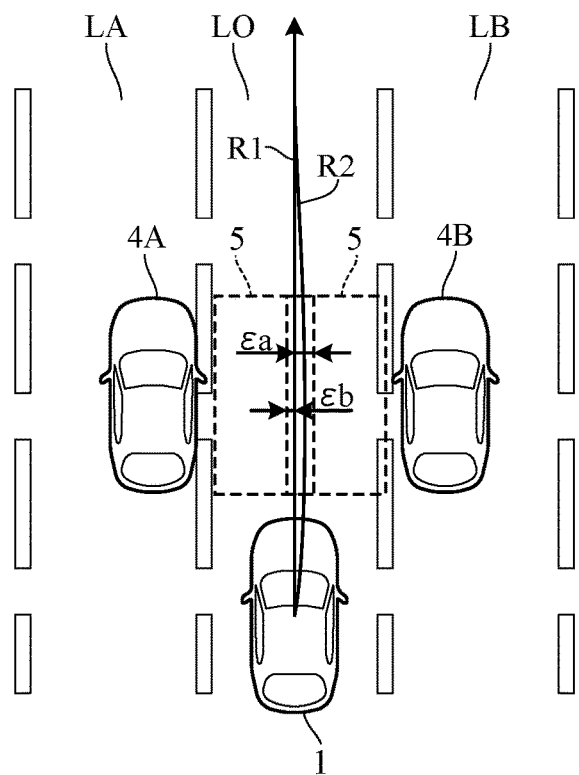
FIG. 7A is a diagram for describing the target path in a traveling scene in which the buffer areas of the vehicles traveling in parallel on the left and right sides overlap the reference target path, when not prohibiting offset.
Figure 7B:
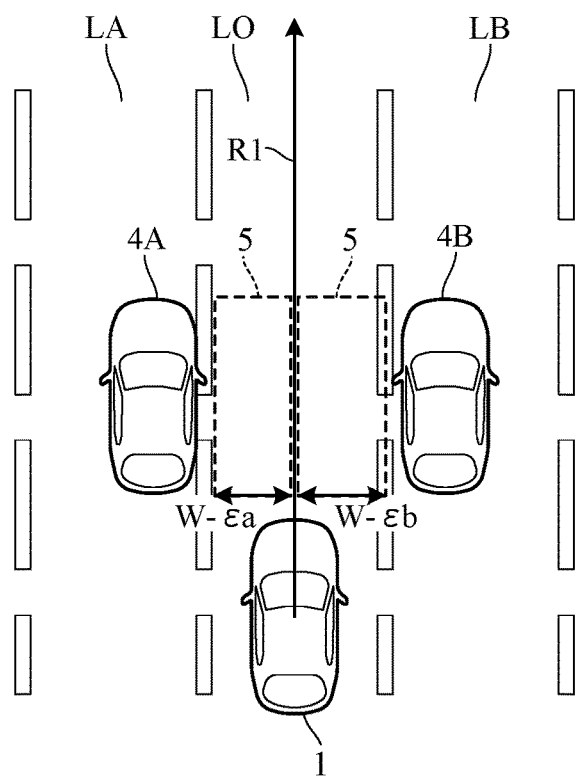
FIG. 7B is a diagram for describing the target path in a traveling scene in which the buffer areas of the vehicles traveling in parallel on the left and right sides overlap the reference target path, when prohibiting offset.

As illustrated in FIG. 7A, also in a travel scene in which the buffer areas 5 of the vehicles 4A and 4B traveling in parallel on both the left and right sides overlap the reference target path R1 (do not cut in), the first determination unit 13 determines that it is necessary to offset the reference target path R1, and the offset unit 14 generates the offset path R2. Then, in a case where the second determination unit 15 determines that the vehicle 4A traveling in parallel on the left side and the vehicle 4B traveling in parallel on the right side are present within the predetermined range in the advancing direction, the offset prohibition unit 16 calculates the cross-border amounts εa and εb (FIG. 7A), and both the left and right buffer areas 5 are subject to the setback, as illustrated in FIG. 7B. In this case, a following expression (vi) is established and the first determination unit 13 determines that neither the buffer area 5 on the left side nor the buffer area 5 on the right side overlaps the reference target path R1. Therefore, it is determined that it is not necessary to offset the reference target path R1, and thus the offset of the reference target path R1 is prohibited. Also in this case, the reference target path R1 that has been generated by the path generation unit 12 is determined as the final target path.

$$YB+W-\varepsilon b \leq F(X) \leq YA-W+\varepsilon a \quad (vii)$$

The travel control unit 17 controls the traveling actuator 2 so that the self-vehicle 1 travels along the finally determined target path. Accordingly, even though the traveling scene in which the self-vehicle 1 overtakes the vehicles 4A and 4B traveling in parallel or the self-vehicle 1 is overtaken by the vehicles 4A and 4B traveling in parallel continues, the frequent changes in the target path are suppressed, so that smooth vehicle behaviors are achievable. Note that when the vehicles 4A and 4B traveling in parallel cut in the own lane LO and become the preceding vehicles, the driving mechanism and the braking mechanism are controlled to travel on the center of the own lane LO (on the reference target path R1) keeping a certain distance from the preceding vehicles, so that smooth vehicle behaviors are achievable.

Figure 8:
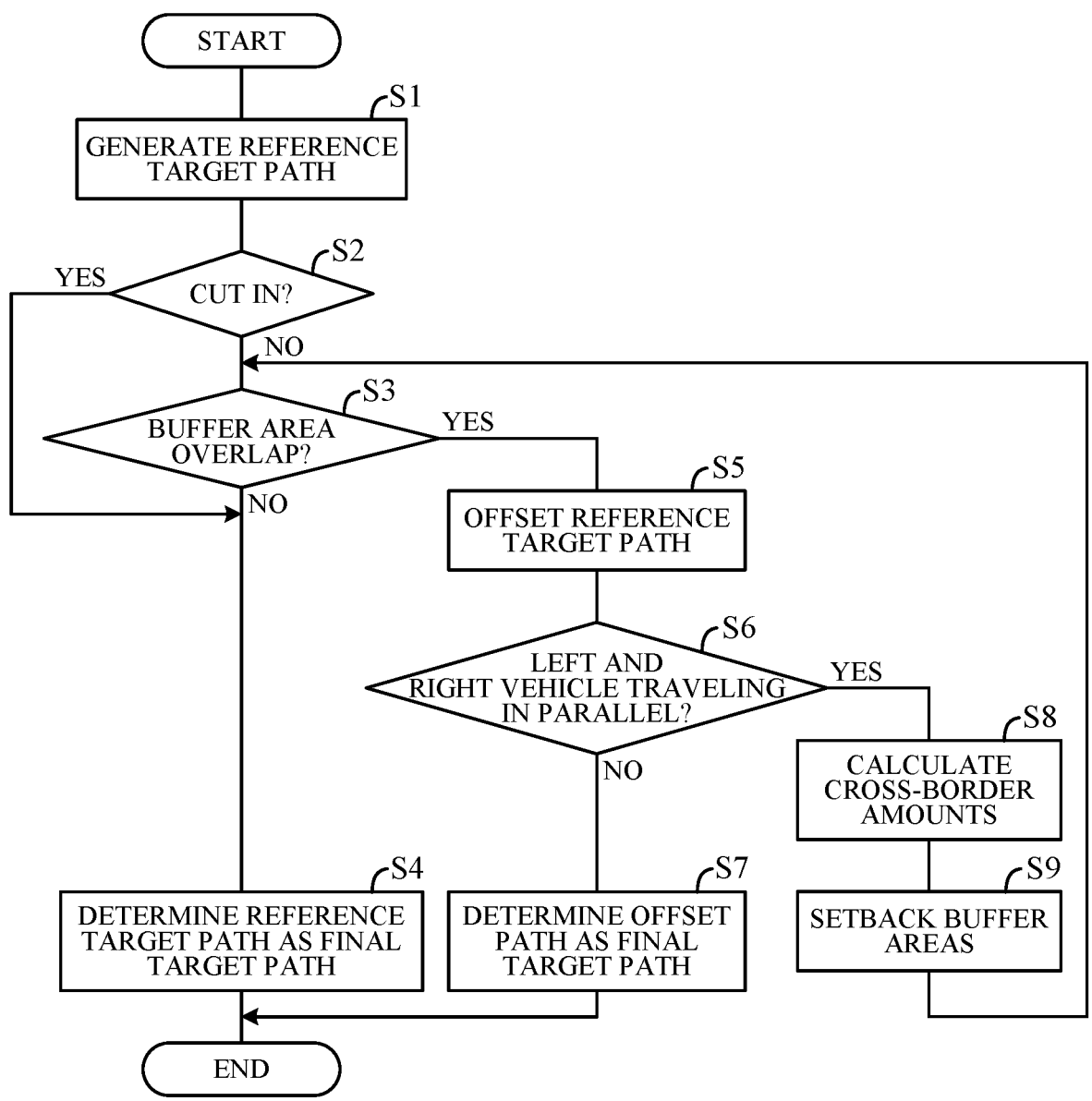
FIG. 8 is a flowchart illustrating an example of path generation processing performed by an ECU in FIG. 1.

FIG. 8 is a flowchart illustrating an example of path generation processing performed by the ECU 10. The processing illustrated in this flowchart starts, for example, when the self-vehicle 1 starts up and the ECU 10 is activated, and is repeatedly performed at a predetermined cycle corresponding to the processing cycle of the ECU 10.

As illustrated in FIG. 8, in the path generation processing, first, in S1 (S: processing step), the own lane LO is recognized, based on a signal from the external sensor 3, and the reference target path R1 is generated, based on a recognition result. Next, in S2, it is determined whether at least one of the vehicles 4A and 4B traveling in parallel has moved across the division line and has cut in the own lane LO. In a case where a negative determination is made in S2, the processing proceeds to S3, and in a case where a positive determination is made, the processing proceeds to S4. In S3, the vehicles 4A and 4B traveling in parallel on the left and right sides and the buffer areas 5 corresponding to them are respectively recognized, based on the signal from the external sensor 3, and it is determined whether each buffer area 5 overlaps the reference target path R1 generated in S1, based on the recognition result. In a case where a negative determination is made in S3, the processing proceeds to S4, and the reference target path R1 generated in S1 is determined as the final target path.

On the other hand, in a case where a positive determination is made in S3, the processing proceeds to S5, the reference target path R1 generated in S1 is offset to avoid the buffer area 5, and the offset path R2 is generated. Next, in S6, it is determined whether the vehicle 4A traveling in parallel on the left side and the vehicle 4B traveling in parallel on the right side are present within the predetermined range in the advancing direction of the self-vehicle 1. In a case where a negative determination is made in S6, the processing proceeds to S7, and the offset path R2 generated in S5 is determined as the final target path.

On the other hand, in a case where a positive determination is made in S6, the processing proceeds to S8, and the cross-border amounts εa and εb of the buffer areas 5 on the left and right sides are respectively calculated. Next, in S9, the buffer areas 5 recognized in S3 are respectively subject to the setback by the cross-border amounts εa and εb calculated in S8, and the processing returns to S3. In this case, a negative determination is made in S3, and the reference target path R1 is determined as the final target path in S4.

In this manner, in the traveling scene in which the buffer areas 5 of the vehicles 4A and 4B traveling in parallel overlap the reference target path R1, the reference target path R1 is offset in the direction away from the vehicles 4A and 4B traveling in parallel (S3, S5, S7), so that the traveling path that can reduce the uneasy feeling of the occupant can be generated. In addition, the offset of the reference target path R1 is prohibited in the traveling scene in which the vehicle 4A traveling in parallel on the left side and the vehicle 4B traveling in parallel on the right side are present within the predetermined range in the advancing direction (S6 to S9, S3 to S4), so that it is possible to prevent the occupant from feeling a sense of incongruity conversely caused by the offset.

Further, the offset is prohibited by the setback of the buffer area 5 by the cross-border amount ε, which is an amount that the buffer area 5 has moved across the reference target path R1 in the vehicle width direction (S8 to S9), so that the offset of the reference target path R1 can be prohibited smoothly. That is, while maintaining the basic processing pattern (S1 to S5) for determining whether to offset the reference target path R1, based on the determination result as to whether the buffer area 5 overlaps the reference target path R1, the offset of the reference target path R1 can be prohibited smoothly.

According to the present embodiment, the following operations and effects are achievable.

(1) The apparatus 100 includes: the external sensor 3 and the surroundings recognition unit 11 that acquire location information of an object in a surrounding area of the self-vehicle 1; the path generation unit 12 that generates the reference target path R1 of the self-vehicle 1, based on the location information that has been acquired by the external sensor 3 and the surroundings recognition unit 11; the first determination unit 13 that determines whether the buffer area 5 within a predetermined range in the vehicle width direction from the vehicles 4A and 4B respectively traveling in parallel in the adjacent lanes LA and LB adjacent to the own lane LO in which the self-vehicle 1 is traveling overlaps the reference target path R1 that has been generated by the path generation unit 12, based on the location information that has been acquired by the external sensor 3 and the surroundings recognition unit 11; the offset unit 14 that offsets the reference target path R1 in a direction away from the vehicles 4A and 4B traveling in parallel, in a case where the first determination unit 13 determines that the buffer area 5 (at least one buffer area 5) overlaps the target path; the second determination unit 15 that determines whether the vehicle 4A traveling in parallel on the left side in the left adjacent lane LA adjacent to the left side of the own lane LO and the vehicle 4B traveling in parallel on the right side in the right adjacent lane LB adjacent to the right side of the own lane LO are present within the predetermined range in the advancing direction of the self-vehicle 1, based on the location information that has been acquired by the external sensor 3 and the surroundings recognition unit 11; and the offset prohibition unit 16 that prohibits the offset unit 14 from offsetting the reference target path R1, in a case where the second determination unit 15 determines that the vehicle 4A traveling in parallel on the left side and the vehicle 4B traveling in parallel on the right side are present within the predetermined range in the advancing direction (FIG. 1).

In a case where the vehicles 4A and 4B traveling in parallel are respectively present in the left and right adjacent lanes LA and LB, the traveling scene in which the self-vehicle 1 overtakes any of the vehicles 4A and 4B traveling in parallel or the self-vehicle 1 is overtaken by any of the vehicles 4A and 4B traveling in parallel continues in some cases. In such cases, if the reference target path R1 is offset whenever the vehicle 4A or 4B traveling in parallel having a large vehicle width or the vehicle 4A or 4B traveling in parallel to be closer to the own lane LO appears on a forward side of the self-vehicle 1, the target path will be frequently changed, and this may give the occupant a sense of incongruity conversely.

In a case where the vehicles 4A and 4B traveling in parallel on both the left and right sides are present, the offset of the reference target path R1 is prohibited. Thus, even though the traveling scene in which the self-vehicle overtakes the vehicle traveling in parallel or the self-vehicle is overtaken by the vehicle traveling in parallel continues, the frequent changes in the target path are suppressed, so that smooth vehicle behaviors are achievable. In addition, in a case where the vehicle 4A or 4B traveling in parallel cuts in the own lane LO and becomes a preceding vehicle, the driving mechanism and the braking mechanism are controlled to travel on the center of the own lane LO (on the reference target path R1) keeping a certain distance from the preceding vehicle, so that smooth vehicle behaviors are achievable.

(2) In a case where the second determination unit 15 determines that the vehicle 4A traveling in parallel and the vehicle 4B traveling in parallel are present within the predetermined range in the advancing direction, and in a case where the first determination unit 13 determines that any of the buffer area 5 corresponding to the vehicle 4A traveling in parallel on the left side and the buffer area 5 corresponding to the vehicle 4B traveling in parallel on the right side overlaps the reference target path R1, the offset prohibition unit 16 prohibits the offset unit 14 from offsetting the reference target path R1 (FIGS. 5B and 6B).

(3) In a case where the second determination unit 15 determines that the vehicle 4A traveling in parallel on the left side and the vehicle 4B traveling in parallel on the right side are present within the predetermined range in the advancing direction, and in a case where the first determination unit 13 determines that both the buffer area 5 corresponding to the vehicle 4A traveling in parallel on the left side and the buffer area 5 corresponding to the vehicle 4B traveling in parallel on the right side overlap the reference target path R1, the offset prohibition unit 16 prohibits the offset unit 14 from offsetting the reference target path R1 (FIG. 7B).

(4) The offset prohibition unit 16 calculates the cross-border amount c by which the buffer area 5 has moved across the reference target path R1 in the vehicle width direction, based on the location information that has been acquired by the external sensor 3 and the surroundings recognition unit 11, and narrows the buffer area 5 by the cross-border amount c that has been calculated to prohibit the offset unit 14 from offsetting the reference target path R1 (FIGS. 5B, 6B, and 7B). In this case, it is possible to smoothly prohibit the offset of the reference target path R1 while maintaining the basic processing pattern for determining whether to offset the reference target path R1, based on the determination result as to whether the buffer area 5 overlaps the reference target path R1.

(5) The length W of the predetermined range in the vehicle width direction is predefined. For example, it is predefined, based on a test result by a skilled driver. Accordingly, the reference target path R1 can be offset in an appropriate traveling scene in accordance with the distances to the vehicles 4A and 4B traveling in parallel.

(6) The length D of the predetermined range in the advancing direction is defined with the self-vehicle 1 as a reference. For example, it is defined with the self-vehicle 1 as a reference, in accordance with the traveling speed of the self-vehicle 1, the traveling speeds of the vehicles 4A and 4B traveling in parallel, the traveling speed of the following vehicle, the type of a road on which the self-vehicle 1 is traveling, a weather condition, or the like.

(7) The vehicles 4A and 4B traveling in parallel include the vehicles 4A and 4B traveling in parallel in the adjacent lanes LA and LB on a forward side of the self-vehicle 1 and the vehicles 4A and 4B traveling in parallel in the adjacent lanes LA and LB on a rearward side of the self-vehicle 1.

In the above embodiments, the description has been given with regard to an example in which the surroundings recognition unit 11 acquires the location information of an object including the traveling lane and other vehicles in the surrounding areas of the self-vehicle 1, based on the signal from the external sensor 3. However, the information acquisition unit that acquires the location information of the object in the surrounding area of the self-vehicle is not limited to such an example. For example, the location information of the object in the surrounding area of the self-vehicle may be acquired via vehicle-to-everything (V2X) communication with another vehicle, an infrastructure facility, a cloud server, or the like.

In the above embodiments, the description has been given with regard to an example in which the path generation unit 12 generates the reference target path R1 along the center line of the own lane LO. However, the path generation unit that generates the target path of the self-vehicle is not limited to such an example. For example, the reference target path R1 closer to the outside of the road than to the center line may be generated, based on a setting value that is changeable in accordance with a preference of the driver or a learning value based on a travel history of the driver. The reference target path R1 closer to the inside in a turning direction than to the center line may be generated in accordance with a curvature radius of the own lane LO.

In the above embodiments, the description has been given with regard to an example in which the offset prohibition unit 16 performs the setback of the buffer area 5, and thus prohibits the offset. However, any offset prohibition unit may be applicable, as long as it prohibits the offset in a case where it is determined that the vehicles 4A and 4B traveling in parallel on both the left and right sides are present. For example, in the case where it is determined that the vehicles 4A and 4B traveling in parallel on both the left and right sides are present, the offset may be prohibited by determining the reference target path R1 before the offset as the final target path (in a case where a positive determination is made in S6 of FIG. 8, the processing proceeds to S4).

In the above embodiments, the description has been given with regard to an example in which the apparatus 100 includes the travel control unit 17. However, the path generation apparatus is not limited to such an example. For example, a display control unit that controls a display unit such as a head-up display to display a finally determined target path superimposed on a road on a forward side of the vehicle may be included.

The above embodiment can be combined as desired with one or more of the aforesaid modifications. The modifications can also be combined with one another.

According to the present invention, it becomes possible to suppress frequent changes in the target path.

Above, while the present invention has been described with reference to the preferred embodiments thereof, it will be understood, by those skilled in the art, that various changes and modifications may be made thereto without departing from the scope of the appended claims.

The invention claimed is:

1. A path generation apparatus, comprising:
an external sensor mounted on a subject vehicle and configured to detect an external situation with an advancing direction of the subject vehicle as a center; and
an electronic control unit including a processor and a memory coupled to the processor, wherein
the electronic control unit is configured to perform:
  acquiring location information of an object in a surrounding area of the subject vehicle based on the external situation detected by the external sensor;
  recognizing an own lane in which the subject vehicle is traveling based on the location information;
  generating a reference path of the subject vehicle based on the own lane;
  determining whether a buffer area within a predetermined range in a vehicle width direction from a vehicle traveling in parallel in an adjacent lane adjacent to the own lane overlaps the reference path based on the location information;
  controlling a steering mechanism of the subject vehicle to travel along the reference path when it is not determined that the buffer area overlaps the reference path;
  offsetting the reference path in a direction away from the vehicle traveling in parallel to generate an offset path when it is determined that the buffer area overlaps the reference path;
  determining whether a vehicle traveling in parallel in a left adjacent lane adjacent to a left side of the own lane and a vehicle traveling in parallel in a right adjacent lane adjacent to a right side of the own lane are present within the predetermined range based on the location information;
  when it is not determined that the vehicle traveling in parallel in the left adjacent lane and the vehicle traveling in parallel in the right adjacent lane are present within the predetermined range, controlling the steering mechanism to travel along the offset path; and
  when it is determined that the vehicle traveling in parallel in the left adjacent lane and the vehicle traveling in parallel in the right adjacent lane are present within the predetermined range, calculating a cross-border amount by which the buffer area has moved across the reference path in the vehicle width direction based on the location information, narrowing the buffer area by the cross-border amount, and performing the determining whether the buffer area overlaps the reference path based on the location information after the narrowing.

2. The path generation apparatus according to claim 1, wherein
the electronic control unit is configured to perform:
  the calculating and the narrowing when it is determined that the vehicle traveling in parallel in the left adjacent lane and the vehicle traveling in parallel in the right adjacent lane are present within the predetermined range, and one of the buffer area corresponding to the vehicle traveling in parallel in the left adjacent lane and the buffer area corresponding to the vehicle traveling in parallel in the right adjacent lane overlaps the reference path.

3. The path generation apparatus according to claim 1, wherein the electronic control unit is configured to perform:

when it is determined that the vehicle traveling in parallel in the left adjacent lane and the vehicle traveling in parallel in the right adjacent lane are present within the predetermined range, and both of the buffer area corresponding to the vehicle traveling in parallel in the left adjacent lane and the buffer area corresponding to the vehicle traveling in parallel in the right adjacent lane overlap the reference path, calculating the cross-border amount for each buffer area, and narrowing each buffer area by the respective cross-border amount.

4. The path generation apparatus according to claim 1, wherein a length of the predetermined range in the vehicle width direction is predefined.

5. The path generation apparatus according to claim 1, wherein a length of the predetermined range in the advancing direction is defined with the subject vehicle as a reference.

6. The path generation apparatus according to claim 1, wherein the vehicle traveling in parallel includes:

the vehicle traveling in parallel in the adjacent lane on a forward side of the subject vehicle; and the vehicle traveling in parallel in the adjacent lane on a rearward side of the subject vehicle.

7. The path generation apparatus according to claim 1, wherein the electronic control unit is configured to perform:

acquiring the location information of the own lane and the vehicle traveling in parallel based on the external situation detected by the external sensor.

\* \* \* \* \*